June 14, 1927.
G. LOECK
GASTROSCOPE
Filed Dec. 18, 1925
1,632,612
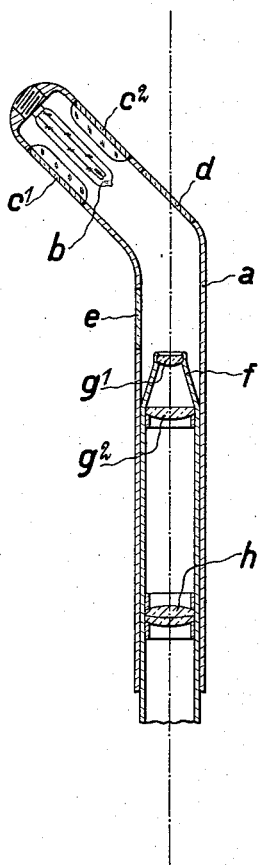

Patented June 14, 1927.

1,632,612

UNITED STATES PATENT OFFICE.

GUNTHER LOECK, OF BERLIN, GERMANY, ASSIGNOR TO FIRM OF GEORG WOLF G. M. B. H., OF BERLIN, GERMANY.

GASTROSCOPE.

Application filed December 18, 1925, Serial No. 76,344, and in Germany December 19, 1924.

The present invention has for its object to provide a gastroscope which obviates the danger possibly arising while introducing the gastroscope hitherto used into the human body. In the customary gastroscopes the gastroscope body is only provided with a lateral look-out aperture. Hence, the look-out will not be possible to the observer until the head of the gastroscope has been introduced into the stomach. During the introduction itself the observer is consequently only dependent upon the feeling and therefore, for instance, running the risk of injuring during the introduction the œsophagus of the individual to be examined. The new gastroscope is in a known way provided with a curved beak for the illuminating device, however, in addition to the lateral look-out aperture it has a look-out aperture lying in the axial direction of the gastroscope body. By using during the introduction an optical tube, inserted into the gastroscope body, which is constructed for the look-out in its axial direction, it is possible to observe during the introduction in the direction of introduction and consequently avoid injuries of the aforesaid kind. Moreover, it is possible to look with such an optical tube through the lateral look-out opening obliquely past the point of the beak and thus ascertain that the latter causes no injuries.

In order to impart to the field of the look-out aperture lying in the axial direction, sufficient luminosity, it is advisable to construct the illuminating device in such a way that it also emits light towards the side of the beak, lying in the direction of introduction of the gastroscope, while the usual illuminating devices are so constructed as only to radiate the field of the lateral look-out aperture.

The annexed drawing shows as an example the head of a gastroscope according to the invention in a longitudinal section.

A tube $a$, forming the body of the gastroscope, carries at its upper end a beak curved by 45° in the point of which is disposed a glow lamp $b$. On both sides of the latter there are inserted two windows $c^1$ and $c^2$ into the tube wall. A window $d$ is provided where the principal axis of the tube strikes the tube wall and another window $e$ is located on the side of the tube. For introducing the gastroscope a tube $f$ is slipped into the tube $a$, which contains in itself the optical parts. The annexed drawing only represents of these parts the objective $g^1$, $g^2$ and a reversing lens $h$.

During the introduction it is possible to observe with the tube $f$ through the window $d$ in the direction of introduction as well as observe through the window $e$ the part to which the point of the beak is guided. Both parts of the field of view are eliminated by the glow-lamp $b$. The gastroscope having been introduced, the tube $f$ should be exchanged for one of the customary observation tubes, arranged for the lateral look-out through the window $e$.

I claim:

1. Outer tube of a gastroscope, adapted to receive an inner tube destined for observation, the outer tube having a curved beak and containing within this beak an illuminating device, and two windows disposed on the outer tube, the one of these windows lying laterally and the other lying in the axial direction of the outer tube, both in such a relative position as to afford a simultaneous look-out through both windows with a single sighting tube.

2. Outer tube of a gastroscope, adapted to receive an inner tube destined for observation, the outer tube having a curved beak and containing within this beak an illuminating device, adapted to emit light in the plane, which is determined by the axis of the outer tube proper and the axis of the beak, towards both sides of the beak, and two windows disposed on the outer tube, the one of these windows lying laterally and the other lying in the axial direction of the outer tube, both in such a relative position as to afford a simultaneous look-out through both windows with a single sighting tube.

GUNTHER LOECK.